(12) United States Patent
Viollet et al.

(10) Patent No.: US 11,041,876 B2
(45) Date of Patent: Jun. 22, 2021

(54) SYSTEM FOR MEASURING THE DISTANCE OF AN OBSTACLE USING OPTICAL FLOW

(71) Applicants: UNIVERSITÉ D'AIX-MARSEILLE, Marseilles (FR); CENTRE NATIONAL DE LA RECHERCHE SCIENTIFIQUE, Paris (FR)

(72) Inventors: Stephane Marie Vincent Viollet, Ceyreste (FR); Fabien Thierry Alain Colonnier, Saint Macaire en Mauges (FR); Erik Vanhoutte, Marseilles (FR)

(73) Assignees: UNIVERSITE D'AIX-MARSEILLE, Marseilles (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 194 days.

(21) Appl. No.: 16/339,030

(22) PCT Filed: Oct. 5, 2017

(86) PCT No.: PCT/FR2017/052739
§ 371 (c)(1),
(2) Date: Apr. 3, 2019

(87) PCT Pub. No.: WO2018/065737
PCT Pub. Date: Apr. 12, 2018

(65) Prior Publication Data
US 2019/0361044 A1 Nov. 28, 2019

(30) Foreign Application Priority Data

Oct. 6, 2016 (FR) ...................................... 1659663

(51) Int. Cl.
*G01P 13/04* (2006.01)
*G01F 1/32* (2006.01)
*G05D 1/08* (2006.01)

(52) U.S. Cl.
CPC .......... *G01P 13/045* (2013.01); *G01F 1/3209* (2013.01); *G05D 1/0858* (2013.01)

(58) Field of Classification Search
None
See application file for complete search history.

(56) References Cited

U.S. PATENT DOCUMENTS 8,917,383 B2 * 12/2014 Fuglsang ................ F03D 7/042
356/28
9,387,927 B2 * 7/2016 Rischmuller .......... G05D 1/102
(Continued)

FOREIGN PATENT DOCUMENTS

FR 3012231 A1 4/2015

OTHER PUBLICATIONS

Dec. 5, 2017 International Search Report issued in International Patent Application No. PCT/FR2017/052739.
(Continued)

*Primary Examiner* — Peter J Macchiarolo
*Assistant Examiner* — Jermaine L Jenkins
(74) *Attorney, Agent, or Firm* — Oliff PLC

(57) ABSTRACT

A system for measuring the distance of an obstacle, in which an optical flow is measured radially while rotating along a circle in a plane intersecting the obstacle; and the distance of the obstacle is determined according to the amplitude of the optical flow, the radius of the circle, and the speed of rotation.

10 Claims, 2 Drawing Sheets

(56) References Cited

U.S. PATENT DOCUMENTS

2012/0197461 A1    8/2012    Barrows et al.
2014/0037278 A1*  2/2014    Wang .................. H04N 5/2328
                                                                     396/55

OTHER PUBLICATIONS

Apr. 9, 2019 International Preliminary Report on Patentability issued in International Patent Application No. PCT/FR2017/052739.
Franck Ruffier et al. "Visual Control of Two Aerial Micro-Robots by Insect-Based Autopilots". Advanced Robotics, vol. 18, No. 8, 2004, pp. 771-786.
Stéphane Viollet et al. "Biologically-Inspired Visual Scanning Sensor for Stabilization and Tracking". Proceedings of the 1999 IEEE/RSJ International Conference on Intelligent Robots and Systems, vol. 1, Oct. 17, 1999, pp. 204-209.
W. Kreitmair-Steck. "Heliradar—A Rotating Antenna Synthetic Aperture Radar for Helicopter Allweather Operations". Guidance and Control Panel 59th Symposium on "Dual Usage in Military and Commercial Technology in Guidance and Control", Rome, Oct. 20-21, 1994, pp. 12-1 through 12-8.

* cited by examiner

SYSTEM FOR MEASURING THE DISTANCE OF AN OBSTACLE USING OPTICAL FLOW

FIELD

The invention relates to obstacle detection systems using optical flow techniques, in particular for aircraft.

BACKGROUND

Optical flow techniques are often considered in anti-collision systems for drones. The articles by Laurent Muratet et al., "A Contribution to Vision-Based Autonomous Helicopter Flight in Urban Environments" (Robotics and Autonomous Systems, Volume 50, Issue 4, Pages 195-209, Mar. 31, 2005), and Simon Zingg et al., "MAV Navigation Through Indoor Corridors Using Optical Flow" (ICRA 2010), for example, propose to guide a drone between buildings by equalizing the optical flows of the sidebands of an image taken by a camera oriented in the direction of displacement. The optical flows of the image are thus used qualitatively or differentially, without calculating absolute speed or distance.

FIG. 1A illustrates an image taken by a front camera during the movement of a drone between buildings, according to a configuration proposed in these articles. A nearby building, visible on the right side of the image, generates an optical flow (represented by an arrow towards the right) that is greater than that of a distant building appearing in the left side of the image. An instantaneous observation of the optical flows of this image tends to indicate that it is necessary to turn to the left to decrease the optical flow on the right.

FIG. 1B illustrates an optical flow obtained when the camera faces a flat frontal obstacle (a facade) that occupies the entire field of vision. The optical flow increases radially from the center, the flow being zero in the central zone. Such a flow field can be used to avoid a collision only if the image of the obstacle extends sufficiently beyond the central zone, so that the optical flow is measurable. If the obstacle is small and on the axis of travel, it may remain undetectable.

To determine a distance from an optical flow, it is known that linear travel components should be used, whereas the raw optical flow values provided by the sensors also include rotational components that should be compensated. The rotational components to be compensated may be measured by a gyroscopic system mounted in the aircraft.

Thus, optical flows are not generally used to measure distances quantitatively. In some vehicles, optical flows are however used to provide a speed in a quantitative manner, for example the ground speed of an aircraft. To calculate the speed, the system requires the distance to the observed object (e.g. flight altitude), which value is known or supplied to the system by another sensor (e.g. altimeter).

SUMMARY

To measure the distance of an obstacle according to the invention, an optical flow may be measured radially while rotating along a circle in a plane intersecting the obstacle; and the distance of the obstacle is determined according to the amplitude of the optical flow, the radius of the circle, and the speed of rotation.

This can be achieved by providing a device for measuring the distance of an obstacle, comprising a rotating element mounted on the object, configured to rotate continuously at a determinable rotational speed; and an optical flow sensor configured to measure an optical flow at an eccentric point of the rotating element.

The optical flow sensor may be configured to measure the optical flow radially or axially.

The device may comprise an operating circuit for the optical flow sensor, configured to determine the distance of the obstacle from a maximum of the optical flow measured during a revolution of the rotating element, the eccentricity of the measuring point, and the rotational speed.

The operating circuit may be configured to determine the orientation of the obstacle from the angular position of the rotating element at which the maximum optical flow is measured.

The optical flow sensor may be a local motion sensor. The optical flow sensor may then comprise an optical system eccentrically mounted on the rotating element, a photosensor offset near the center of rotation of the rotating element, and optical fibers connecting the optical system to the photosensor.

The rotational speed and eccentricity values may be chosen such that they render negligible other velocity components occurring during the use of the device.

A helicopter rotor blade may be provided with a measuring device of the aforementioned type, the optical flow sensor being configured to measure the optical flow at the distal end of the blade.

BRIEF DESCRIPTION OF DRAWINGS

Other advantages and features will become more clearly apparent from the following description of particular embodiments of the invention provided for exemplary purposes only and represented in the appended drawings, in which.

DESCRIPTION OF EMBODIMENTS

Optical flow is inseparable from the presence of motion in the image observed by the sensor. The measurements are better if the speed is high and the area of interest is remote from the axis of travel. Until now, the measurement of the optical flow in an aircraft was based on the sole movement of the aircraft. However, some types of aircraft, such as helicopters, may have a slow or stationary flight, making it difficult to detect obstacles near the blades, such as a rock wall, with known techniques based on optical flows.

It is proposed herein to animate the optical flow sensor with a permanent movement relative to the vehicle, in a configuration providing a usable optical flow even if the vehicle is stationary. More specifically, it is proposed to measure the optical flow while rotating along a circle, for example at the ends of the rotor blades of a helicopter.

Rotations are in principle unusable in an optical flow, because they introduce components that are independent of the observation distance. This is true in practice only for "pure" rotations, that is, when the flow sensor is on the axis of rotation. Offsetting the flow sensor relative to the axis of rotation produces a tangential velocity which introduces a usable linear travel component in the optical flow.

Figure 1A:
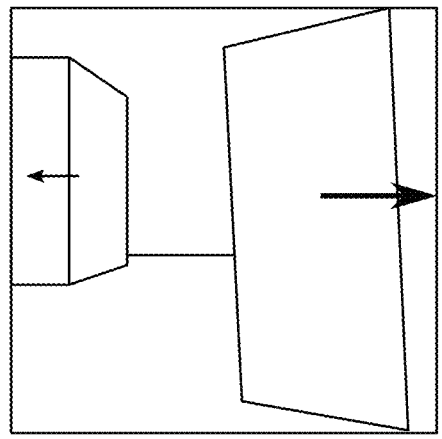
FIGS. 1A and 1B, previously described, are images used to exploit an optical flow.
Figure 1B:
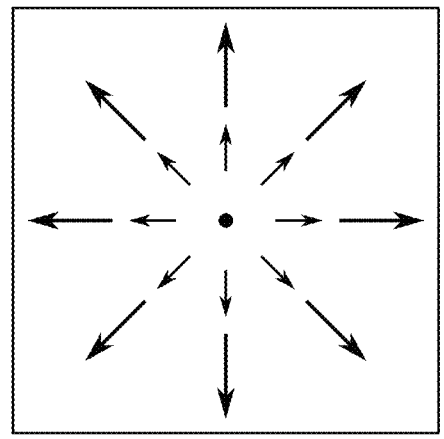
Figure 2:
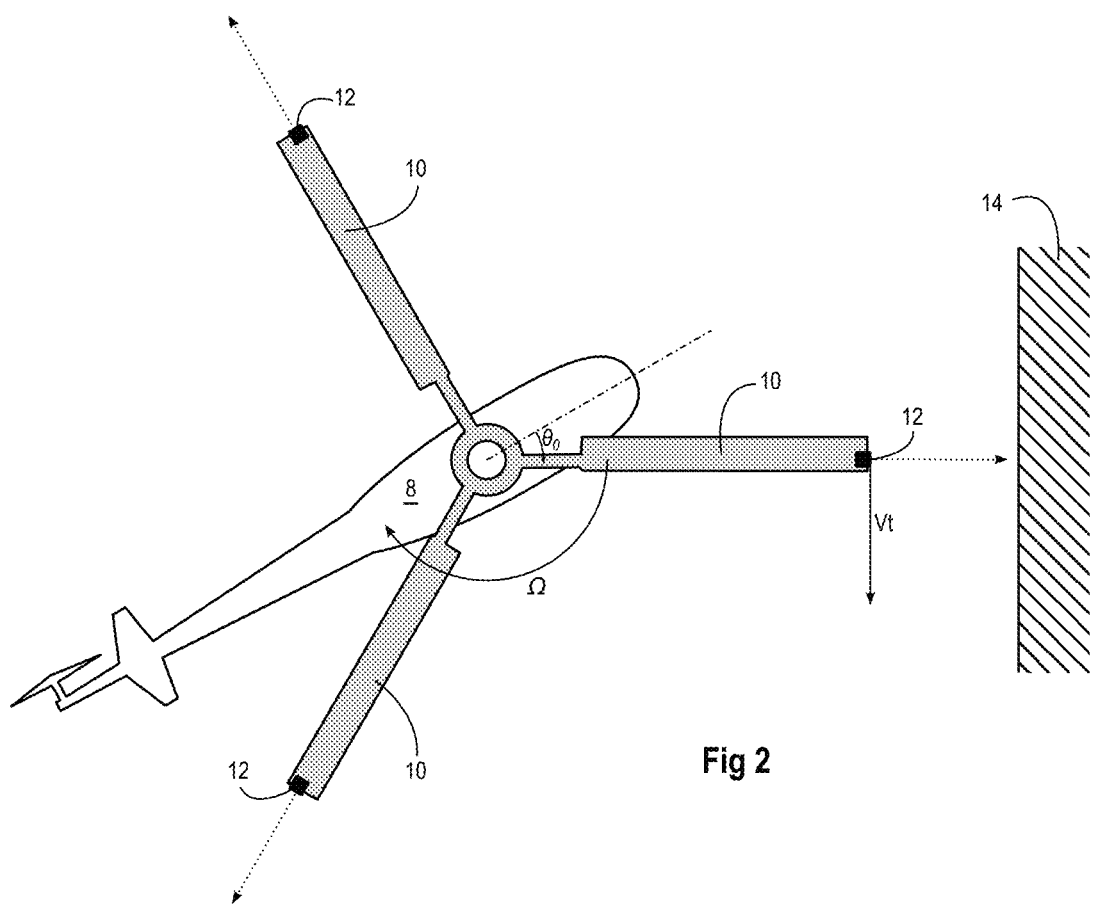
FIG. 2 illustrates a helicopter in a plan view, comprising optical flow sensors located at the ends of the blades, according to an embodiment of a distance measurement system based on optical flows.

FIG. 2 illustrates an exemplary implementation of this system in a helicopter. The helicopter 8, viewed from above, includes, for example, a rotor with three blades 10. At the distal end of each blade is mounted an optical flow sensor 12, oriented radially outwards. Thus, the observation axis of each sensor, illustrated by a dashed arrow, is radial.

The rotor rotates at an angular velocity $\Omega$, producing a tangential velocity Vt of the sensors, equal to $\Omega R$, where R is the distance of the sensors from the center of rotation. Each sensor produces a total flow, expressed in radians per second:

$$\omega_{tot} = \omega_{rot} + \omega_{trans}$$

Where $\omega_{rot}$ is a component of rotation equal to the angular velocity $\Omega$ of the rotor and $\omega_{trans}$ is a linear travel component that depends on the tangential velocity Vt=$\Omega R$. For any angular position $\theta$ of a blade 10, the travel component is expressed by:

$$\omega_{trans} = Vt/D = \Omega R/D$$

Where D is the distance between the end of the blade and the nearest object in the extension of the blade (in the optical axis of the corresponding flow sensor 12).

So $$\omega_{tot} = \Omega(1+R/D)$$

Which allows to express the distance according to the measured total flow:

$$D = R\Omega/(\omega_{tot}-\Omega)$$

In the case of a helicopter, the angular velocity $\Omega$ is substantially constant and known, of the order of 40 radians per second for a rotor with three blades and a diameter of 10 m. The propulsion power is adjusted by changing the pitch of the blades. The length of the blades being of the order of 5 m, the tangential velocity Vt is significant, of the order of 200 m/s. This speed is so high that most other movements, in particular occurring during a flight of the helicopter among obstacles, have a negligible influence on the optical flow, so that their compensation may be superfluous.

The cruising speed of a helicopter, which can reach 100 m/s, could have an influence on the optical flow measured. However, such a cruising speed is only used in open terrain, requiring in principle no obstacle monitoring.

Applying these principles of measurement to a helicopter with counter-rotating rotors overcomes eventual problems related to the speed of flight. Indeed, the blades of the two rotors scan the terrain in opposite directions, so that the speed of flight is added to one and subtracted from the other at a given angular position $\theta$. Thus, the flight speed is canceled in the calculation of the average of the flow produced by a blade of the first rotor and the flow produced by a blade of the second rotor at the same angular position $\theta$.

In any case, the flight speed of the helicopter is usually measured. This measurement of the flight speed can, if necessary, be used to compensate the optical flow measurements with the knowledge of the angular positions of the optical flow measurements.

The pitch of the blades theoretically has an influence on the flow measurement, since the modification of the pitch modifies the inclination of the flux sensor with respect to its axis of displacement. However, since the pitch is adjusted within a range of about 5 degrees of amplitude, the influence is only 0.4% (1−cos 5°), so compensation may also be unnecessary.

As the blades 10 rotate, the flow sensors 12 scan the obstacles all around the helicopter within the plane including the blades. Frontal obstacles, located on the axis of travel of the helicopter, even small, are detectable with as much precision as the other obstacles. The presence of a nearby obstacle is characterized by a local maximum of the optical flux measured by a given sensor 12, and the orientation of the obstacle relative to the longitudinal axis of the helicopter is provided by the angular position of the blade, at which the local maximum is measured. The angular position of the blade, if it is not provided by a sensor present in the helicopter, can be deduced from the angular velocity of the rotor and a landmark on the helicopter, which is located in the field scanned by the flow sensors, such as the tail fin or the anti-torque rotor.

FIG. 2 also shows a particular obstacle, namely a vertical wall 14, such as a cliff or a building facade. In some helicopter operations, it is desirable to approach as close as possible to the wall. However, it is difficult to evaluate the distance of a wall relative to the blade tips, and in particular to maintain a sufficient distance while maneuvering the helicopter. On a long wall, it is also difficult to recognize the nearest point.

The fact that the flow sensors 12 have a circular trajectory is useful in this situation. Indeed, the linear travel flow, instead of being almost constant as in the case of a rectilinear trajectory, is expressed by:

$$\omega_{trans} = Vt \frac{\cos^2(\theta - \theta_0)}{R(1 - \cos(\theta - \theta_0)) + D_{min}}$$

Where $\theta$ is the angle of the blade 10 considered relative to the longitudinal axis of the helicopter, $\theta_0$ is the angle of the blade relative to the longitudinal axis of the helicopter when its end is closest to the wall (for example the right blade in FIG. 2), and $D_{min}$ is the distance measured for $\theta=\theta_0$ (shortest distance).

Figure 3:
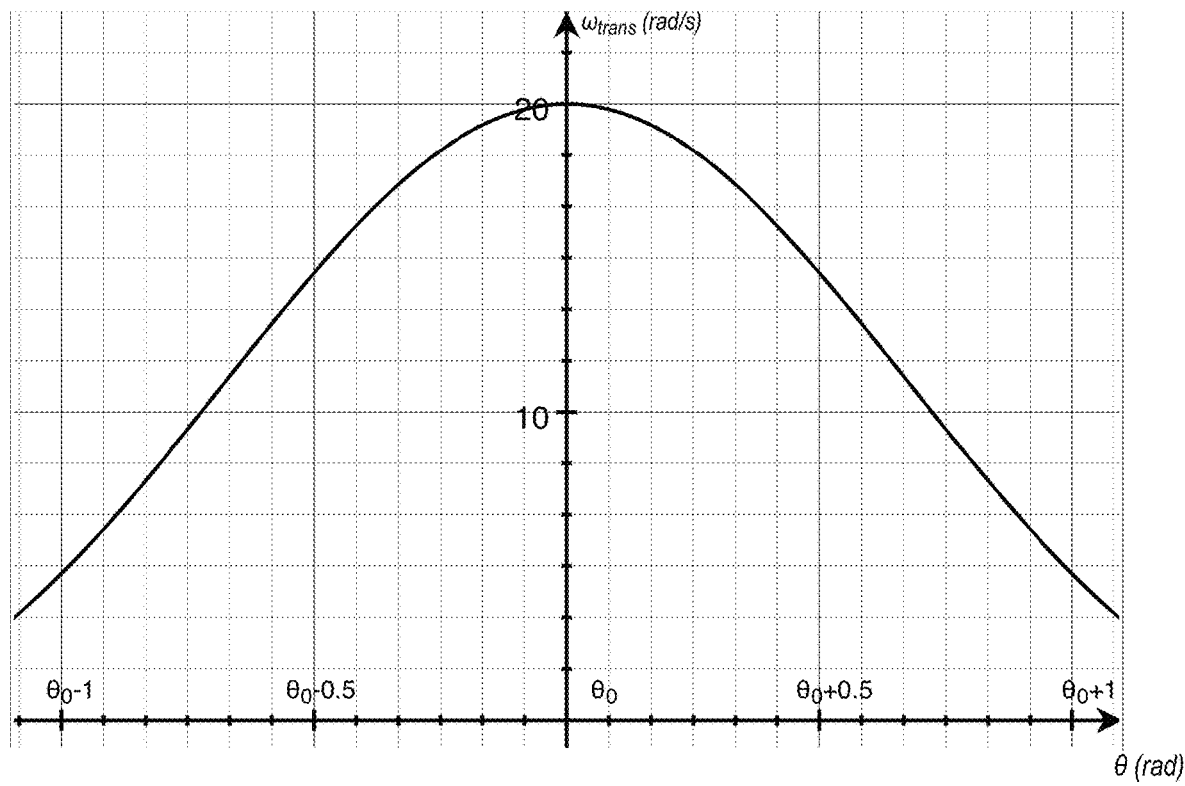
FIG. 3 is a graph illustrating the evolution of the optical flow supplied by the system of FIG. 2 in the presence of a flat vertical obstacle, as a function of the angular position of the blades.

FIG. 3 is a graph illustrating the evolution of the translational optical flow $\omega_{trans}$ as a function of the angular position of a blade, for R=5 m, $D_{min}$=10 m, and Vt=200 m/s. The translational flow has a marked local maximum for $\theta=\theta_0$. Thus, the evaluation of the distance to a wall and the determination of the orientation of the wall follow the same methodology as for detecting an isolated obstacle, namely the search for a local maximum among the measurement samples, and determining the blade angle at which this local maximum is achieved.

Since the optical flow measurements are based on the contrasts of the objects observed, dedicated optical flow sensors are proposed which are significantly simpler than cameras with image post-processing algorithms. Such sensors are called Local Motion Sensors (LMS), and are inspired by insect vision. Such sensors are also well suited to high-speed implementations, for example of the order of 200 m/s at the ends of the blades of a helicopter. Indeed, their simplicity implies low computation resources, which makes it possible to provide measurements at a rate compatible with high speed motion. They are also light, so not stressed when subjected to centrifugal forces encountered at the end of a helicopter blade. LMS sensors are described, for example, by Fabien Expert et al., in the article "Outdoor Field Performances of Insect-Based Visual Motion Sensors" (Journal of Field Robotics 2011).

Figure 4:
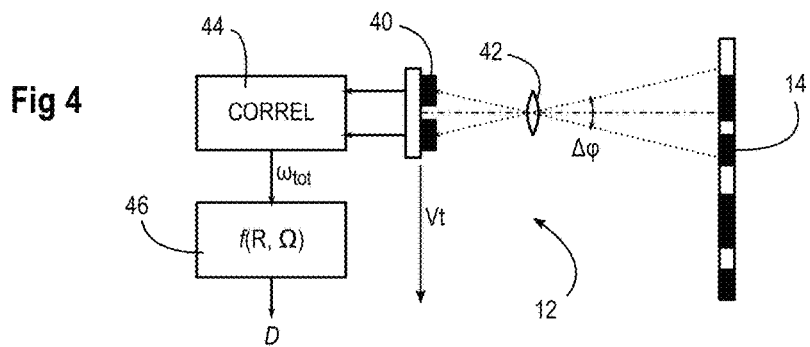
FIG. 4 illustrates an example of a local motion sensor that can be used in the system of FIG. 2.

FIG. 4 schematically represents an example of an elementary LMS sensor directed towards the wall 14, illustrated here by a succession of contrasts. The sensor comprises a pair of photodiodes 40 aligned in the direction of the displacement to be measured, here according to the tangential velocity Vt. A lens 42 is arranged so that the two photodiodes observe the scene from angles differing by a small value Δφ, of the order of 1°.

In short, the optical flow is determined as the ratio between the angular difference Δφ and the time elapsed between the detections of the same contrasted pattern by the two photodiodes.

The signals from the two photodiodes are normally identical but offset in time. They undergo a bandpass filtering and then a correlation at 44, which provides a measure of the time difference between the two signals. The optical flow is the inverse of this time difference multiplied by the angular difference. Finally, the distance D is obtained at 46 from the radius R and the angular velocity Ω, which are known parameters.

To improve the measurements, the LMS sensor may be configured so that each photodiode has a substantially Gaussian angular sensitivity characterized by the half-height angle called Δρ. This Gaussian angular sensitivity can be obtained, for example, by slightly defocusing the lens 42. This achieves, in particular, a low-pass spatial filtering limiting false optical flow measurements. This configuration is described, for example, in [F. L. Roubieu, F. Expert, M. Boyron, B. Fuchslock, S. Viollet, F. Ruffier (2011) "A Novel 1-gram Insect Based Device Measuring Visual Motion Along 5 Optical Directions", IEEE Sensors 2011 Conference, Limerick, Ireland, pp. 687-690]. This technique tends to make the LMS sensor "short-sighted".

In other words, the sensor is inoperative beyond a certain distance. An LMS sensor implemented in helicopter blades may be designed to have a range of 20 to 30 m, which is sufficient for many situations, including hovering near vertical walls.

Better performing LMS sensors include several pairs of aligned photodiodes, often three pairs.

All the elements of FIG. 4 could be mounted at the end of each blade of the helicopter. In some applications, this setup could however be too heavy or bulky for the dimensions of the blade, especially if it is a drone rotor blade.

Figure 5:
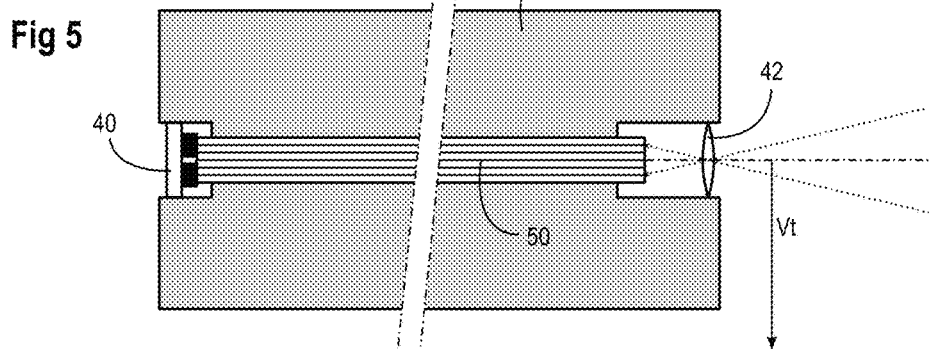
FIG. 5 illustrates an alternative local motion sensor that can be used in the system of FIG. 2.

FIG. 5 illustrates a variant of the sensor of FIG. 4 that can be installed in small blades. The sensor of FIG. 4 is divided into two parts. Only the optical system 42 of the sensor is mounted at the distal end of the blade 10, for example in a housing provided for this purpose in the blade. The photodiodes 40, which can be mounted with their control circuitry on a bulkier module, are offset at the proximal end of the blade, near the center of the rotor. An optical fiber bundle 50 connects the optical system 42 to the photodiodes 40. This bundle 50 may be embedded in the bulk of the blade during molding of the blade or slid into a channel previously formed in the blade. The bundle 50 may comprise numerous individual optical fibers which provide independent guidance of the optical flows towards the two photodiodes.

A measurement system thus arranged in the blades of the main rotor of a helicopter detects obstacles in the plane containing the blades, and outside this plane depending on the viewing angle of the sensors used. If it is desired to detect obstacles also in a vertical plane, the measurement system could be implemented in the anti-torque rotor of the helicopter, if it is not in a fenestron.

Also, for automatic terrain monitoring and for landing procedures where measurement of the distance between an aircraft and a mobile landing platform is desirable, it is possible to orient the optical flow sensors perpendicularly to the plane containing the aircraft blades, that is to say axially. In this case, the rotation component $\omega_{rot}$ related to the rotation of the rotor disappears from the raw measurements provided by the optical flow sensors, but it may then be necessary to account for the variations of the pitch of the blades.

Many variations and modifications of the embodiments described herein will be apparent to those skilled in the art. Although the distance measurement system has been described essentially in relation to a helicopter, it can be used in any vehicle, having blades or not. If the vehicle does not have blades originally, a rotating element, such as a disc or a ring, may be mounted for this purpose on the vehicle, in a plane that is to be monitored.

The distance measuring device has been described in connection with a vehicle, and its effectiveness has been shown especially when the vehicle is stationary. The measuring device may also be integrated within a stationary object equipped with a rotating element, such as a wind turbine, to detect the approach of flying elements and to take safety measures (such as slowing the blades) if these flying elements come too near the blades.

The invention claimed is:

1. A device for measuring the distance of an obstacle to an object, comprising:
   a rotating element mounted on the object, configured to rotate continuously at a determinable rotational speed about a rotation axis; and
   an optical flow sensor configured to measure an optical flow at a point of the rotating element eccentric to the rotation axis, whereby the eccentricity of the point of measurement introduces a linear travel velocity component in the measured optical flow, exploitable to determine the distance even when the object is stationary.

2. The device according to claim 1, wherein the optical flow sensor is configured to measure the optical flow radially.

3. The device according to claim 2, comprising an operating circuit for the optical flow sensor, configured to determine the distance of the obstacle from a maximum of the optical flow measured during a revolution of the rotating element, the eccentricity of the measuring point, and the rotational speed.

4. The device according to claim 3, wherein the operating circuit is configured to determine the orientation of the obstacle from the angular position of the rotating element at which the maximum optical flow is measured.

5. The device according to claim 1, wherein the optical flow sensor is configured to measure the optical flow axially.

6. The device of claim 1, wherein the optical flow sensor is a local motion sensor.

7. The device according to claim 6, wherein the optical flow sensor comprises:
   an optical system eccentrically mounted on the rotating element,
   a photosensor offset near the center of rotation of the rotating element, and
   optical fibers connecting the optical system to the photosensor.

8. The device according to claim 1, wherein the rotational speed and eccentricity values render negligible other velocity components occurring during the use of the device.

9. A helicopter rotor blade forming the rotating element of a measuring device according to claim 8, the optical flow sensor being configured to measure the optical flow at the distal end of the blade.

10. A method for measuring the distance of an obstacle, comprising the following steps:
   measuring an optical flow radially while rotating along a circle in a plane intersecting the obstacle, the radius of the circle introducing a linear travel speed component in the measured optical flow; and
   determining the distance of the obstacle as a function of the amplitude of the optical flow, the radius of the circle, and the speed of rotation.

* * * * *